United States Patent
Wagner et al.

(10) Patent No.: US 10,851,696 B2
(45) Date of Patent: Dec. 1, 2020

(54) METHOD AND DEVICE FOR OPERATING AN EXHAUST GAS AFTERTREATMENT DEVICE OF AN ENGINE SYSTEM INCLUDING AN INTERNAL COMBUSTION ENGINE

(71) Applicant: Robert Bosch GmbH, Stuttgart (DE)

(72) Inventors: Alexandre Wagner, Stuttgart (DE); Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/402,351

(22) Filed: May 3, 2019

(65) Prior Publication Data

US 2019/0353069 A1 Nov. 21, 2019

(30) Foreign Application Priority Data

May 17, 2018 (DE) .......................... 10 2018 207 703

(51) Int. Cl.
*F01N 3/20* (2006.01)
(52) U.S. Cl.
CPC ..................... *F01N 3/20* (2013.01)
(58) Field of Classification Search
CPC ............ F01N 2430/06; F01N 2560/14; F01N 2900/1402; F01N 3/101; F01N 3/20; F02D 2041/141; F02D 2041/1419; F02D 2200/0814; F02D 41/02; F02D 41/1441; F02D 41/1454; F02D 41/1458
See application file for complete search history.

(56) References Cited

U.S. PATENT DOCUMENTS

| | | | | |
|---|---|---|---|---|
| 6,195,988 B1* | 3/2001 | Yasui | .................. | F02D 41/1403 123/674 |
| 6,230,486 B1* | 5/2001 | Yasui | .................. | F02D 41/1402 123/674 |
| 6,266,605 B1* | 7/2001 | Yasui | .................. | F02D 41/1403 60/276 |
| 6,481,201 B2* | 11/2002 | Kako | .................... | F01N 11/007 60/274 |
| 7,654,252 B2* | 2/2010 | Kato | ................... | F02D 41/1441 123/672 |
| 7,908,846 B2* | 3/2011 | Tai | .......................... | F01N 3/208 60/277 |
| 9,657,663 B2* | 5/2017 | Santillo | ..................... | F01N 3/08 |
| 10,060,894 B2* | 8/2018 | Michalske | .......... | F02D 41/1495 |
| 2002/0173901 A1* | 11/2002 | Yoshizawa | .......... | F02D 41/0295 701/109 |
| 2006/0282211 A1* | 12/2006 | Yasui | ................... | G05B 13/042 701/103 |
| 2011/0184700 A1* | 7/2011 | Michalske | .......... | F02D 41/1495 702/182 |
| 2015/0039256 A1* | 2/2015 | Michalske | ................ | F01N 9/00 702/104 |

* cited by examiner

*Primary Examiner* — Jesse S Bogue
(74) *Attorney, Agent, or Firm* — Norton Rose Fulbright US LLP; Gerard Messina

(57) ABSTRACT

A method for operating an engine system including an internal combustion engine and an exhaust gas aftertreatment device, including: carrying out a fill level control to control a fill level of the exhaust gas aftertreatment device as a function of a predefined fill level setpoint value; operating a pilot control for the fill level control; and adapting the pilot control as a function of a deviation between a measured lambda value and a modeled lambda value.

14 Claims, 2 Drawing Sheets

METHOD AND DEVICE FOR OPERATING AN EXHAUST GAS AFTERTREATMENT DEVICE OF AN ENGINE SYSTEM INCLUDING AN INTERNAL COMBUSTION ENGINE

CROSS REFERENCE

The present application claims the benefit under 35 U.S.C. § 119 of German Patent Application No. DE 102018207703.7 filed on May 17, 2018, which is expressly incorporated herein by reference in its entirety.

FIELD

The present invention relates to engine systems including internal combustion engines, combustion exhaust gases being treated during operation with the aid of an exhaust gas aftertreatment device. Furthermore, the present invention relates to a method for operating such an engine system and, in particular, a method for adapting a model-based control of the exhaust gas aftertreatment device.

BACKGROUND INFORMATION

During the operation of an internal combustion engine, combustion exhaust gases are formed which include a plurality of combustion by-products in addition to nitrogen, carbon dioxide, and water. These combustion by-products include hydrocarbons, carbon monoxide, and nitrogen oxides which are classified as pollutants and whose emission is limited by law. According to the presently known related art, applicable exhaust gas limiting values for motor vehicles which are operated by internal combustion engines may only be adhered to if a catalytic converter is used for exhaust gas aftertreatment.

Therefore, corresponding exhaust gas aftertreatment devices are provided on the output side, of which the so-called three-way catalytic converter is most commonly used, since it has a high conversion rate for hydrocarbons, carbon monoxide, and nitrogen oxides. This high conversion rate is, however, only achieved in a narrow operating range of the internal combustion engine in which the air/fuel mixture in the cylinder prior to combustion corresponds to an approximately stoichiometric quantity distribution (i.e., to an air ratio $\lambda=1$). The tolerance range admissible around this stoichiometric quantity distribution is called the catalytic converter window.

In order to operate the exhaust gas aftertreatment device within the so-called catalytic converter window, a lambda control is usually used in today's engine control systems. The lambda control is based on exhaust gas sensor signals which are detected by exhaust gas sensors, the so-called lambda sensors, on the input side and on the output side of the exhaust gas aftertreatment device. The exhaust gas sensor signals correspond to lambda values and indicate a corresponding oxygen content in the combustion exhaust gas, whereby an air/fuel ratio of the air/fuel mixture is determined at the point in time immediately prior to the combustion.

To control the input-side lambda value, i.e., the lambda value upstream from the exhaust gas aftertreatment device, the oxygen content of the combustion exhaust gas is measured with the aid of the input-side lambda sensor and the control of the fuel quantity is correspondingly corrected in a pilot control for the purpose of metering the fuel quantity. In order to increase the accuracy of the control, the output-side lambda value of the output-side lambda sensor is additionally used. The output-side lambda value which is detected by the output-side lambda sensor is generally used for a setpoint control which is upstream from the lambda control.

In addition to the setpoint control, which in general corrects only minor deviations from a lambda value of one and is designed to operate comparably slowly, present engine control systems in general include a functionality which ensures in the case of/following great deviations from a lambda value of one in the form of a lambda pilot control that the catalytic converter window is quickly reached again, for example after phases of coasting cutoff and the like. Present control concepts have the disadvantage, however, that the output-side lambda sensor does not detect a departure from the catalytic converter window until relatively late and thus a correction via the injection quantity may only take place in a delayed manner.

SUMMARY

According to the present invention, a method for operating an engine system including an internal combustion engine and an exhaust gas aftertreatment device, as well as a device and an engine system, are provided.

Additional embodiments are described herein.

According to a first aspect of the present invention, a method for operating an engine system including an internal combustion engine and an exhaust gas aftertreatment device is provided, including the following steps:

carrying out a fill level control to control a fill level of the exhaust gas aftertreatment device as a function of a predefined fill level setpoint value;

operating a pilot control for the fill level control;

adapting the pilot control as a function of a deviation between a measured lambda value and a modeled lambda value.

In accordance with the present invention, an method for operating an engine system including an exhaust gas aftertreatment device, which is controlled by a lambda control in a model-based manner, the lambda control is provided with an adaptable pilot control. The model-based control of the exhaust gas aftertreatment device in general has the advantage that an imminent departure from the catalytic converter window may be detected earlier than is the case in a setpoint control on the basis of the output-side exhaust gas sensor. An early, targeted correction of the air/fuel mixture may thus be used to counteract the imminent departure from the catalytic converter window.

The robustness of this model-based control may be additionally improved by using a pilot control which is adapted as a function of a deviation between a measured lambda value and a modeled lambda value. Overall, a more rapid response to the deviations of the engine operation from the catalytic converter window is made possible, so that the pollutant emissions may be considerably reduced in particular during dynamic operation.

Furthermore, the measured lambda value may correspond to a measured output-side lambda value and the modeled lambda value may correspond to a modeled output-side lambda value.

It may be provided that the fill level control makes a lambda correction value available as a manipulated variable, which is acted on by a lambda pilot control value as the output of the pilot control, in order to obtain a setpoint lambda value to be controlled.

In particular, a fuel quantity correction variable may be ascertained as a function of the setpoint lambda value and of a lambda control, a fuel quantity to be injected being computed as a function of the fuel quantity correction variable.

Furthermore, the modeled lambda value may be computed with the aid of a system model for providing a physical model of the exhaust gas aftertreatment device, in order to model a modeled fill level based on the measured input-side lambda value, the fill level control being carried out based on the modeled fill level.

In particular, a modeled output-side lambda value may be computed with the aid of the system model, a lambda offset value, as a function of which the pilot control is adapted, being ascertained as a function of a difference between the modeled output-side lambda value and a measured output-side lambda value.

Furthermore, the difference between the modeled output-side lambda value and the measured output-side lambda value may be filtered, in particular low-pass filtered, in order to obtain the lambda offset value, a time constant of the filtering being in particular selected as a function of an operating point of the engine system.

According to one specific embodiment of the present invention, the pilot control may ascertain a fill level setpoint value trajectory to predefine the fill level setpoint values of the fill level control.

It may be provided that the pilot control is designed as an inversion of the system model. This has the advantage that the controller only has to intervene if the fill level of the catalytic converter, which is modeled with the aid of the system model, deviates from the fill level setpoint value trajectory which is computed by the pilot control.

The fill level setpoint value trajectory takes into consideration which lambda values are in fact implementable (for example the combustion limits of the engine or the enrichment or leaning maximally desired under the instantaneous operating conditions).

The inversion of the system model is difficult due to the nonlinearity and the (forward) system model may therefore be used in conjunction with an iterative method, in order to assign a lambda pilot control value to a fill level setpoint value.

According to a further aspect of the present invention, a device for operating an engine system including an internal combustion engine and an exhaust gas aftertreatment device is provided, the device being designed to:

carry out a fill level control to control a fill level of the exhaust gas aftertreatment device as a function of a predefined fill level setpoint value;

operate a pilot control for the fill level control;

adapt the pilot control as a function of a deviation between a measured lambda value and a modeled lambda value.

BRIEF DESCRIPTION OF THE DRAWINGS

Specific embodiments of the present invention are explained in greater detail below on the basis of the figures.

DETAILED DESCRIPTION OF EXAMPLE EMBODIMENTS

The present invention is described in the following by way of example of an engine system including an internal combustion engine whose combustion exhaust gas is processed with the aid of a three-way catalytic converter as the exhaust gas aftertreatment device. In the three-way catalytic converter, oxygen is used as the exhaust gas component to be stored.

Figure 1:
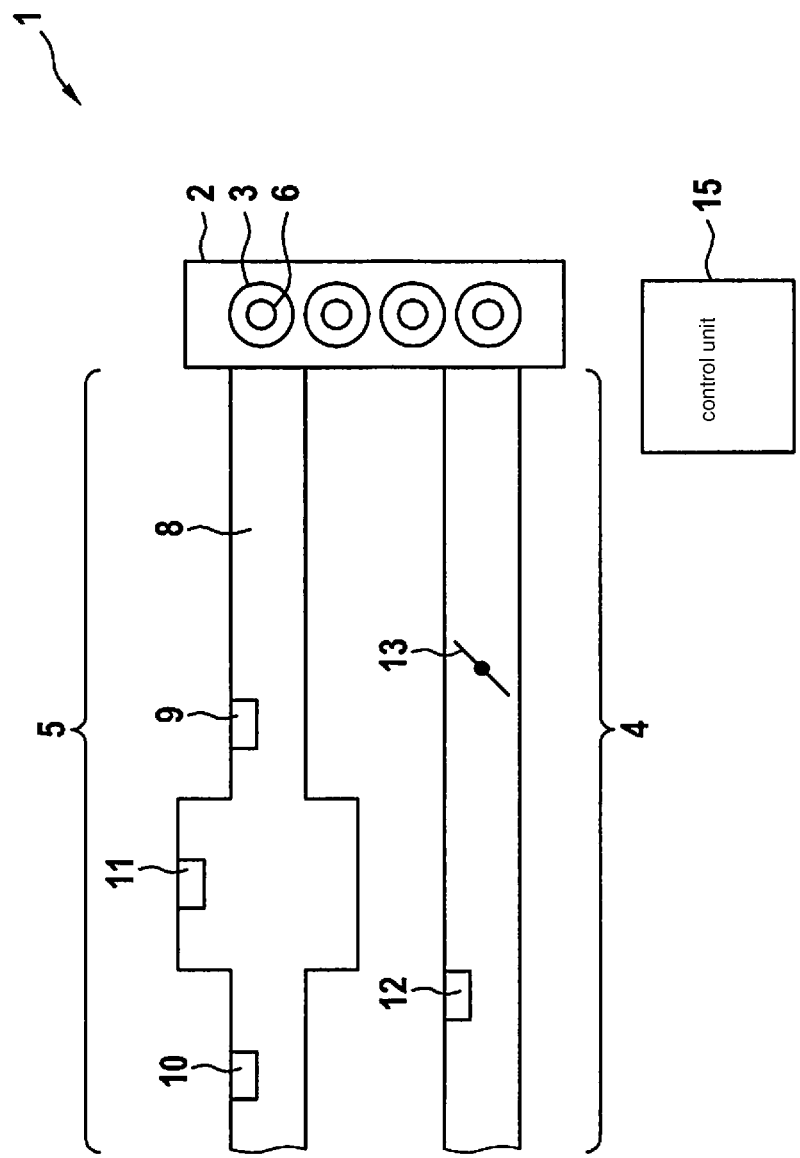
FIG. 1 shows an engine system including an internal combustion engine and an exhaust gas system including an exhaust gas aftertreatment device.

FIG. 1 schematically shows an engine system 1 including an internal combustion engine 2 which is designed to have a number of cylinders 3 (four cylinders in the present exemplary embodiment). Cylinders 3 are supplied with fresh air via an air supply system 4 and via controlled intake valves at each cylinder 3 and the combustion exhaust gas is discharged from cylinders 3 via appropriate outlet valves at each cylinder 3 and via exhaust gas system 5.

Internal combustion engine 2 is operated in a four-stroke operation in a conventional manner. For this purpose, cylinders 3 are supplied with fuel via a particular injector 6, corresponding to a predefined injection quantity, prior to or at the beginning of a combustion stroke, in order to form in the combustion chambers of cylinders 3 an air/fuel mixture which is ignited and combusted during a combustion stroke in the four-stroke operation to generate the propulsion.

Exhaust gas system 5 includes an exhaust gas aftertreatment device 8 which may be designed as a three-way catalytic converter, for example. A three-way catalytic converter converts the exhaust gas components of nitrogen oxides, hydrocarbons, and carbon monoxide in three reaction pathways by reduction in which oxygen is stored in the three-way catalytic converter or by oxidation with the oxygen stored in the three-way catalytic converter. The operating mode of the three-way catalytic converter is conventional and is not discussed here in greater detail.

Upstream from exhaust gas aftertreatment device 8, an input-side exhaust gas sensor 9 is provided which is capable of detecting an oxygen content in the combustion exhaust gas flowing past and which makes a corresponding input-side lambda value available which indicates the oxygen content. On the output side of exhaust gas aftertreatment device 8, an output-side exhaust gas sensor 10 is situated which detects the oxygen content of the purified combustion exhaust gas flowing past and makes this oxygen content available in the form of an output-side lambda value. Input-side exhaust gas sensor 9 is preferably designed as a broadband lambda sensor which allows for the oxygen content, which is usually indicated in the form of an air ratio $\lambda$, to be measured over a broad air ratio range. Output-side exhaust gas sensor 10 is preferably designed as a so-called jump lambda sensor with the aid of which air ratio $\lambda$ may be measured particularly accurately within the range of one, since the signal of output-side exhaust gas sensor 10 changes abruptly in this range.

Exhaust gas aftertreatment device 8 may be equipped with a temperature sensor 11 which detects the temperature of exhaust gas aftertreatment device 8 and provides a corresponding temperature signal.

For the purpose of controlling the operation of engine system 1, a control unit 15 is provided which detects the sensor signals from engine system 1 to determine an engine system state. The engine system state may, for example, be indicated by state variables of engine system 1 which are determined by sensors. The sensors may, for example, include: a fresh air mass flow sensor 12 in air supply system 4 for detecting a fresh air mass flow measured, an engine rotational speed sensor for measuring an instantaneous rotational speed of internal combustion engine 2, exhaust gas sensors 9, 10 for detecting the input-side and the output-side lambda values and a number of others.

Control unit 15 operates internal combustion engine 2 in a conventional manner by controlling actuators corresponding to an external specification. The external specification may be based, for example, on a driver intended torque predefined by an accelerator pedal. The controllable actuators may include the injectors for predefining a fuel quantity to be injected, a throttle valve actuator 13 for adjusting the air supply into internal combustion engine 2, an ignition device (not shown) in each of cylinders 3 whose ignition timing for igniting the air/fuel mixture is predefined, the valve clearances of the intake valves and the outlet valves over time, and the like.

A corresponding fuel quantity to be injected is computed in control unit 15 for providing an engine torque and injectors 6 are correspondingly controlled to inject the computed fuel quantity. At the same time, control unit 15 carries out a control based on input-side and output-side lambda values $\lambda_E$, $\lambda_A$ which are continuously provided by exhaust gas sensors 9, 10.

Figure 2:
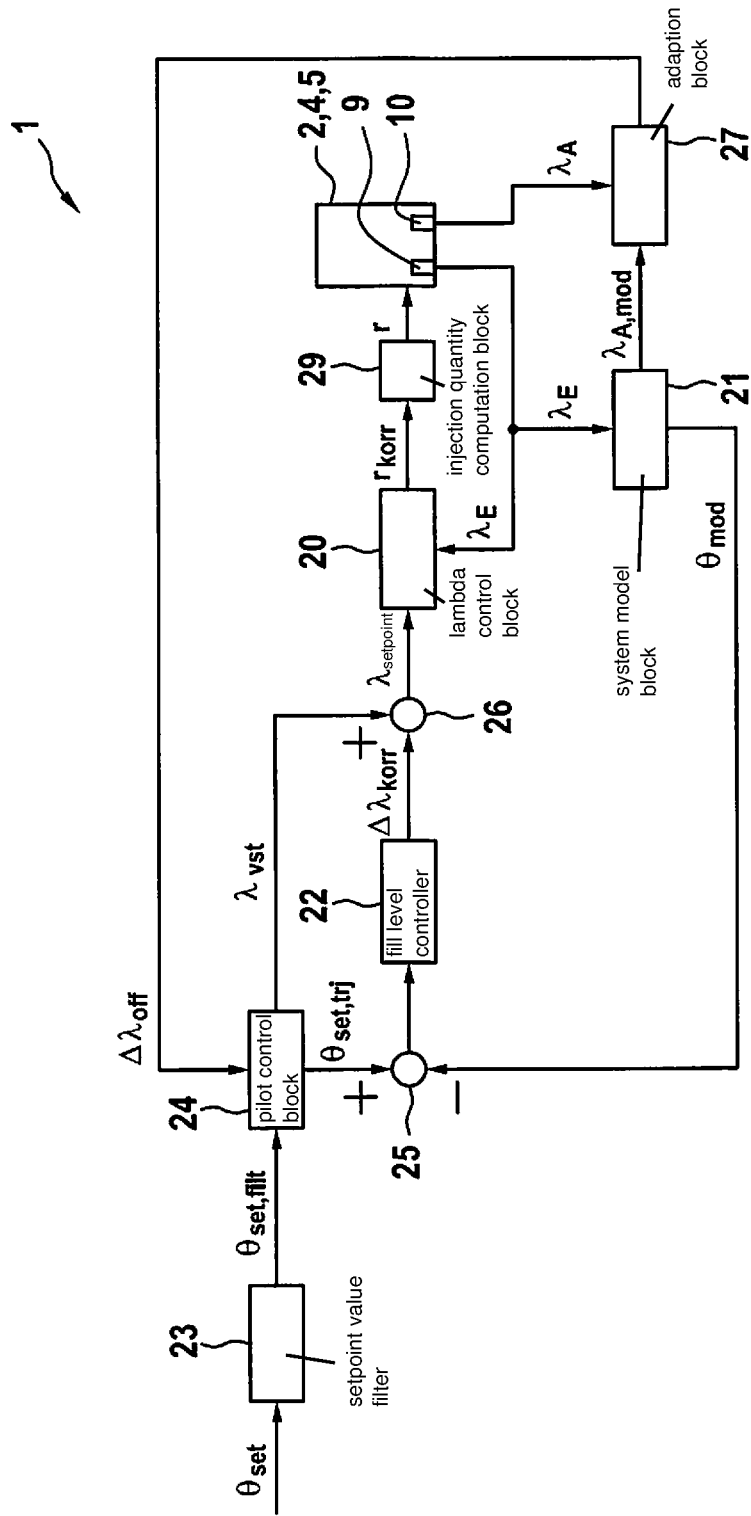
FIG. 2 shows a function illustration of the lambda control for use in the engine system of FIG. 1.

In FIG. 2, a function block diagram is shown which illustrates in greater detail the operating mode of the control in engine system 1. The control is implemented by a fill level controller 22 and a lambda control block 20 and is essentially based on adjusting an instantaneous fill level θ of exhaust gas aftertreatment device 8 to a predefined fill level setpoint value $\theta_{set}$.

In the case of a three-way catalytic converter, the fill level of an exhaust gas aftertreatment device 8 corresponds to an oxygen loading which is preferably to be predefined according to a predefined operating model and is, for example, approximately half of the possible maximum oxygen loading of exhaust gas aftertreatment device 8.

As a function of a lambda correction $\Delta\lambda_{korr}$ predefined by fill level controller 22, lambda control block 20 provides as a manipulated variable a fuel quantity correction variable $r_{korr}$ which is taken into consideration in a suitable manner, in particular by addition, in an injection quantity computation model of an injection quantity computation block 29, which is also carried out in control unit 15 and computes a fuel quantity r to be injected.

Since fill level θ of exhaust gas aftertreatment device 8 cannot be measured, it is modeled with the aid of a system model in a system model block 21. The system model generally includes an input emission model, a catalytic converter model which includes a fill level model and an emission model, and an output emission model. Moreover, the catalytic converter model includes an algorithm for computing a medium fill level θ of exhaust gas aftertreatment device 8.

Each of the above-mentioned models are algorithms which are carried out in control unit 15. The input emission model is used to convert input-side lambda value $\lambda_E$ of input-side exhaust gas sensor 9 into input variables which represent concentrations of $O_2$, $CO$, $H_2$, and $HC$ in the area of input-side exhaust gas sensor 9. The variables computed with the aid of the input emission model are used to model a fill level of the exhaust gas aftertreatment device and the concentrations of the individual exhaust gas components on the output side of exhaust gas aftertreatment device 8 in the fill level model and the output emission model, respectively. The output lambda model converts the concentrations of the individual exhaust gas components, computed with the aid of the catalytic converter model, on the output side of exhaust gas aftertreatment device 8 for the purpose of adapting the system model in a modeled output-side lambda value $\lambda_{A,mod}$ which is to correspond to a lambda value on the output side of exhaust gas aftertreatment device 8. On the one hand, the system model may thus be used to model at least one modeled medium fill level $\theta_{mod}$ of exhaust gas aftertreatment device 8 and, on the other hand, to make a modeled output-side lambda value $\lambda_{A,mod}$ available.

Fill level setpoint value $\theta_{set}$ is prefiltered with the aid of a setpoint value filter 23. Prefiltered fill level setpoint value $\theta_{set,filt}$ is used as a reference variable to control a pilot control, on the one hand, and a fill level control, on the other hand. The lambda control is essentially based on the result of the fill level control in which a filtered fill level setpoint value $\theta_{set,filt}$ or a fill level setpoint value trajectory $\theta_{set,trj}$ is predefined. The fill level control is based on a difference, in particular a difference between filtered fill level setpoint value $\theta_{set,filt}$ and modeled medium fill level $\theta_{mod}$, which is ascertained in a difference element 25. The fill level control may be carried out with the aid of fill level controller 22, which may be in particular designed as a PI controller, and it outputs lambda correction $\Delta\lambda_{korr}$ as a manipulated variable. In this way, medium fill level $\theta_{mod}$, which is modeled with the aid of the system model, is adjusted to fill level setpoint value $\theta_{set}$ which minimizes the probability of breakouts to lean and rich, i.e. the probability of departing from the catalytic converter window, and thus results in minimal emissions.

The pilot control takes place in a pilot control block 24 which, on the one hand, provides a pilot control lambda value $\lambda_{vst}$ and, on the other hand, a setpoint fill level trajectory $\theta_{set,trj}$ as a function of filtered fill level setpoint value $\theta_{set,filt}$. In order to compute that pilot control lambda value $\lambda_{vst}$ which corresponds to filtered fill level setpoint value $\theta_{set,filt}$, pilot control block 24 includes a physical model which corresponds to a system model which is inverse with regard to the system model, i.e. a model which assigns a predefined fill level to a preliminary pilot control lambda value $\lambda'_{vst}$.

If input-side lambda signal $\lambda_E$ is distorted by an offset, a lambda offset value $\Delta\lambda_{off}$ is taken into consideration in pilot control lambda value $\lambda_{vst}$, in particular by adding lambda offset value $\Delta\lambda_{off}$ to preliminary pilot control lambda value $\lambda'_{vst}$.

For the purpose of computing a physically implementable setpoint fill level trajectory, a second system model (copy) is used which has identical parameters and pilot control lambda value $\lambda_{vst}$ as the input lambda. This has the advantage that fill level controller 22 only has to intervene if the actual fill level of exhaust gas aftertreatment device 8, which is modeled with the aid of the system model, deviates from setpoint fill level trajectory $\theta_{set,trj}$.

Thus, not only is the pilot control lambda value corrected, but also the setpoint fill level trajectory is adapted.

While the system model is converting input-side lambda value $\lambda_E$ upstream from exhaust gas aftertreatment device 8 into a modeled (medium) oxygen fill level $\theta_{mod}$ of exhaust gas aftertreatment device 8, the inverse system model of pilot control block 24 is converting filtered fill level setpoint value $\theta_{set,filt}$ into a corresponding setpoint lambda upstream from exhaust gas aftertreatment device 8 (preliminary pilot control lambda value $\lambda'_{vst}$).

The system model of system model block 21 is preferably analytically inverted for the purpose of creating the inverse system model. A common exhaust gas aftertreatment device 8 is, however, a complex, nonlinear dynamic which has time-variant dynamic parameters and may generally only be illustrated by a nonlinear differential system of equations. This typically results in that the system of equations for the inverted system model cannot be solved analytically.

As an alternative to analytically inverting the system model, a numerical inversion of the system model may therefore be provided. The latter is based on the fact that an input-side lambda value is iteratively predefined for the existing system model, in order to obtain with the aid of the system model a corresponding value for the medium fill level of exhaust gas aftertreatment device 8 which corresponds to desired fill level setpoint value $\theta_{set}$ or to filtered fill level setpoint value $\theta_{set,filt}$. If this model value is identical to fill level setpoint value $\theta_{set}$ or to filtered fill level setpoint value $\theta_{set,filt}$, the iteratively predefined input-side lambda value is that value which must be used by the pilot control to reach the setpoint oxygen fill level.

For the purpose of implementation, a second system model (copy) having identical parameters and initially identical state variables is therefore predefined and iterated using variable input-side lambda values until the absolute value of the difference between the actual fill level, which is computed with the aid of the second system model, and desired fill level setpoint value $\theta_{set}$ or filtered fill level setpoint value $\theta_{set,filt}$ is small enough to achieve the accuracy of the pilot control required by the iteration. The thus found value for the input-side lambda value is used as preliminary pilot control lambda value $\lambda'_{vst}$.

Pilot control lambda value $\lambda_{vst}$ of pilot control block 24 and lambda correction $\Delta\lambda_{korr}$ of fill level controller 22 are summed up in a summator element 26 and the sum signal represents setpoint lambda value $\lambda_{setpoint}$ for the input-side lambda value. In addition to pilot control lambda value $\lambda_{vst}$, the pilot control also ascertains setpoint fill level trajectory $\theta_{set,trj}$ for fill level controller 22.

Since the input variables of the system model may be subject to uncertainties and the system model may also be inaccurate, deviations between the variables of fill level $\theta$ of exhaust gas aftertreatment device 8, which are modeled with the aid of the system model, and the corresponding real variables are possible. To compensate for the uncertainties, the model-based control of fill level $\theta$ of exhaust gas aftertreatment device 8 may be adapted accordingly. The adaption may, for example, take place through an intervention into the fill level control and/or into the pilot control.

In the presence of suitable operating conditions, the adaption takes place based on a deviation between output-side lambda value $\lambda_{A,mod}$, which is modeled with the aid of the system model, and measured output-side lambda value $\lambda_A$. The need for adaption arises when the two values differ from one another, in particular by more than a predefined threshold value.

It is advantageous to correct setpoint lambda value $\lambda_{setpoint}$ for the input-side lambda value and the ascertained setpoint fill level trajectory using a lambda offset value $\Delta\lambda_{off}$ which represents a measure for the need for adaption. This measure for the need for adaption results from the difference between output-side lambda value $\lambda_{A,mod}$, which is modeled with the aid of the system model, and measured output-side lambda value $\lambda_A$, in particular as their difference as lambda offset value $\Delta\lambda_{off}$.

By correcting setpoint lambda value $\lambda_{setpoint}$ for the input-side lambda value, the lambda control may respond immediately to changes in lambda offset value $\Delta\lambda_{off}$. Since the system model is not adapted, modeled medium fill level $\theta_{mod}$ deviates from the actual fill level; since, however, setpoint fill level setpoint value trajectory $\theta_{set,trj}$ is also adapted, it follows incorrectly modeled fill level $\theta_{mod}$ of the system model, so that fill level controller 22 faces the same control deviation prior to and after the adaption. Jumps in the control deviation which might result in an upward oscillation of the fill level control are avoided thereby.

It is advantageous to smooth the measure for the need for adaption, i.e., a difference between modeled output-side lambda value $\lambda_{A,mod}$ and measured output-side lambda value $\lambda_A$, with the aid of a filter in an adaption block 27 to obtain lambda offset value $\Delta\lambda_{off}$. The filter may be designed as a PT1 filter, for example, and have a time constant which is a function of the operating point and which may be retrieved from a corresponding parameterizable characteristic map, for example. An integrator may optionally be connected downstream from the filter in order to take long-term effects into consideration. In the oscillated state, the filtered signal corresponds to lambda offset value $\Delta\lambda_{off}$ and, as a result of the uncertainties of the input-side lambda value and the inaccuracies of the system model, exactly to the need for adaption.

It may be provided that the filtering in adaption block 27 only takes place if suitable switch-on conditions are present. In order to be able to rapidly compensate for inaccuracies, it may thus be provided to have the filter carry out an adaption under less restrictive conditions, in particular whenever a stoichiometric mixture is requested and whenever an exhaust gas lambda in the range of 1 is displayed by the output-side exhaust gas sensor. It may be additionally provided that an adaption is carried out only if the signal of output-side exhaust gas sensor 10 is reliable.

It is furthermore advantageous to store the adaption value at the end of a driving cycle and to use the corresponding adaption value as the starting value in a next driving cycle.

The need for adaption may have different causes which are not distinguishable in the present method. The distinction is, however, not necessary for the fill level control, since the fill level is merely to be rapidly and accurately adjusted to the emission-optimal setpoint fill level. If the differentiation takes place in one or several other functionalities between the causes resulting in the need for adaption, it is advantageous to correct the portions in need of adaption, which may be assigned unambiguously, at their point of occurrence.

For example, a diagnosis for a lambda offset for the input-side lambda value may evaluate the content or the input signal of adaption block 27 in the presence of suitable switch-on conditions, in order to distinguish between an offset of the input-side lambda value and a leak in exhaust gas system 5. An offset of the input-side lambda value detected here may be used to correct the actual lambda signal of exhaust gas sensor 9. To ensure that this correction is not taken into consideration twice, corresponding input-side lambda offset value $\Delta\lambda_{off}$ must be subtracted from the content of adaption block 27.

What is claimed is:

1. A method for operating an engine system including an internal combustion engine and an exhaust gas aftertreatment device, the method comprising:
   carrying out a fill level control to control a fill level of the exhaust gas aftertreatment device as a function of a predefined fill level setpoint value;
   operating a pilot control for the fill level control; and
   adapting the pilot control as a function of a deviation between a measured lambda value and a modeled lambda value;
   wherein the modeled lambda value is generated using a system model which includes an input emission model, a catalytic converter model, and an output emission model, the input emission model converting an input lambda value, from an input-side exhaust gas sensor at an input side of the exhaust gas aftertreatment device, to variables representing concentrations of at least three individual components of exhaust gas in an area of the input-side exhaust gas sensor, the catalytic converter model modeling, using the variables from the input emission model, concentrations of individual components of exhaust gas on an output side of the exhaust gas aftertreatment device, and the output emission model converting the modeled concentrations of the individual components from the catalytic converter model to the modeled lambda value.

2. The method as recited in claim 1, wherein the measured lambda value corresponds to a measured output-side lambda value and the modeled lambda value corresponds to a modeled output-side lambda value.

3. The method as recited in claim 1, wherein the fill level control makes a lambda correction value available as a manipulated variable, which is acted on additively, by a lambda pilot control value as an output of the pilot control to obtain a setpoint lambda value to be controlled.

4. The method as recited in claim 3, wherein a fuel quantity correction variable is ascertained as a function of the setpoint lambda value and of a lambda control, a fuel quantity to be injected being computed as a function of the fuel quantity correction variable.

5. The method as recited in claim 1, wherein the modeled lambda value is computed with the aid of a predefined system model for providing a physical model of the exhaust gas aftertreatment device to ascertain a modeled fill level of the exhaust gas aftertreatment device based on a measured input-side lambda value, the fill level control being carried out based on the modeled fill level.

6. The method as recited in claim 5, wherein a modeled output-side lambda value is computed using the system model, a lambda offset value, as a function of which the pilot control is adapted, being ascertained as a function of a difference between the modeled output-side lambda value and a measured output-side lambda value.

7. The method as recited in claim 6, wherein the difference between the modeled output-side lambda value and the measured output-side lambda value is low-pass filtered to obtain the lambda offset value, a time constant of the filtering being selected as a function of an operating point of the engine system.

8. The method as recited in claim 7, wherein the pilot control is an inversion of the system model to ascertain a pilot control lambda value as a function of a desired fill level setpoint value and as a function of the deviation between the measured lambda value and the modeled lambda value, a preliminary pilot control lambda value which is additively acted on by a lambda offset value, which is a function of the deviation between the measured lambda value and the modeled lambda value, being ascertained in as a function of the desired fill level setpoint value.

9. The method as recited in claim 1, wherein the pilot control ascertains a fill level setpoint trajectory to predefine the fill level setpoint values of the fill level control.

10. A control unit for operating an engine system including an internal combustion engine and an exhaust gas aftertreatment device, the control unit being configured to:
carry out a fill level control to control a fill level of the exhaust gas aftertreatment device as a function of a predefined fill level setpoint value;
operate a pilot control for the fill level control;
adapt the pilot control as a function of a deviation between a measured lambda value and a modeled lambda value;
wherein the modeled lambda value is generated using a system model which includes an input emission model, a catalytic converter model, and an output emission model, the input emission model converting an input lambda value, from an input-side exhaust gas sensor at an input side of the exhaust gas aftertreatment device, to variables representing concentrations of at least three individual components of exhaust gas in an area of the input-side exhaust gas sensor, the catalytic converter model modeling, using the variables from the input emission model, concentrations of individual components of exhaust gas on an output side of the exhaust gas aftertreatment device, and the output emission model converting the modeled concentrations of the individual components from the catalytic converter model to the modeled lambda value.

11. A non-transitory machine-readable memory medium on which is stored a computer program for operating an engine system including an internal combustion engine and an exhaust gas aftertreatment device, the computer program, when executed by a processing unit, causing the processing unit to perform:
carrying out a fill level control to control a fill level of the exhaust gas aftertreatment device as a function of a predefined fill level setpoint value;
operating a pilot control for the fill level control; and
adapting the pilot control as a function of a deviation between a measured lambda value and a modeled lambda value;
wherein the modeled lambda value is generated using a system model which includes an input emission model, a catalytic converter model, and an output emission model, the input emission model converting an input lambda value, from an input-side exhaust gas sensor at an input side of the exhaust gas aftertreatment device, to variables representing concentrations of at least three individual components of exhaust gas in an area of the input-side exhaust gas sensor, the catalytic converter model modeling, using the variables from the input emission model, concentrations of individual components of exhaust gas on an output side of the exhaust gas aftertreatment device, and the output emission model converting the modeled concentrations of the individual components from the catalytic converter model to the modeled lambda value.

12. The method as recited in claim 1, wherein the variables from the input emission model represent concentrations of $O_2$, $CO$, $H_2$, and $HC$ in the exhaust gas in the area of the input-side exhaust gas sensor.

13. The control unit as recited in claim 10, wherein the variables from the input emission model represent concentrations of $O_2$, $CO$, $H_2$, and $HC$ in the exhaust gas in the area of the input-side exhaust gas sensor.

14. The non-transitory machine-readable memory medium as recited in claim 11, wherein the variables from the input emission model represent concentrations of $O_2$, $CO$, $H_2$, and $HC$ in the exhaust gas in the area of the input-side exhaust gas sensor.

* * * * *